(12) United States Patent
Loccioni

(10) Patent No.: US 11,583,084 B2
(45) Date of Patent: Feb. 21, 2023

(54) PIECE OF SEATING AND RECLINING FURNITURE AND METHOD FOR ADJUSTING A PIECE OF SEATING AND RECLINING FURNITURE

(71) Applicant: CIAR S.P.A., Pesaro (IT)

(72) Inventor: Diego Loccioni, Pesaro (IT)

(73) Assignee: CIAR S.P.A., Pesaro (IT)

( * ) Notice: Subject to any disclaimer, the term of this patent is extended or adjusted under 35 U.S.C. 154(b) by 50 days.

(21) Appl. No.: 17/178,735

(22) Filed: Feb. 18, 2021

(65) Prior Publication Data
US 2021/0289939 A1 Sep. 23, 2021

(30) Foreign Application Priority Data
Mar. 17, 2020 (DE) ...................... 10 2020 107 243.0

(51) Int. Cl.
| | |
|---|---|
| *A47C 1/024* | (2006.01) |
| *A47C 1/029* | (2006.01) |
| *A47C 1/0355* | (2013.01) |
| *G05B 15/02* | (2006.01) |

(52) U.S. Cl.
CPC ............ *A47C 1/0355* (2013.01); *G05B 15/02* (2013.01)

(58) Field of Classification Search
CPC ......... A47C 3/027; A47C 3/0251; A47C 3/02; A47C 3/025; A47C 3/0255; A47C 3/0257; A47C 1/0242; A47C 1/0355; A47C 7/506; A47C 1/03; A47C 1/032
See application file for complete search history.

(56) References Cited

U.S. PATENT DOCUMENTS

| | | | | |
|---|---|---|---|---|
| 3,019,052 | A * | 1/1962 | Zawadzki | A47C 3/027 601/24 |
| 3,958,827 | A * | 5/1976 | Re | A47C 1/0352 297/322 |
| 5,782,535 | A * | 7/1998 | Lafer | A47C 1/0342 297/423.34 |
| 6,152,529 | A * | 11/2000 | Beason | A47C 3/02 297/270.3 |
| 9,433,295 | B2 * | 9/2016 | Crum | A47C 7/5068 |
| 9,931,256 | B2 * | 4/2018 | White | A61G 5/14 |
| 10,561,244 | B2 * | 2/2020 | Lapointe | A47C 1/0355 |
| 11,406,190 | B2 * | 8/2022 | Jakubowski | A47B 97/00 |

(Continued)

FOREIGN PATENT DOCUMENTS

| | | |
|---|---|---|
| CN | 205125606 | 4/2016 |
| DE | 3835736 | 4/1990 |

(Continued)

*Primary Examiner* — Shin H Kim
(74) *Attorney, Agent, or Firm* — Renner Kenner Greive Bobak Taylor & Weber

(57) ABSTRACT

The invention relates to the adjustment of a piece of seating and reclining furniture with a seat and a backrest, in a positioning mode the seat and/or the backrest are optionally positioned in an upright basic position, a first reclining position or a second reclining position by means of at least one actuator and the seat and/or the backrest in an activatable relaxation mode being movable back and forth. The seat and/or the backrest is adjusted in the positioning mode as well as in the activatable relaxation mode between the first reclining position and the second reclining position by means of the same actuator.

14 Claims, 10 Drawing Sheets

(56) References Cited

U.S. PATENT DOCUMENTS

Figure 1D:
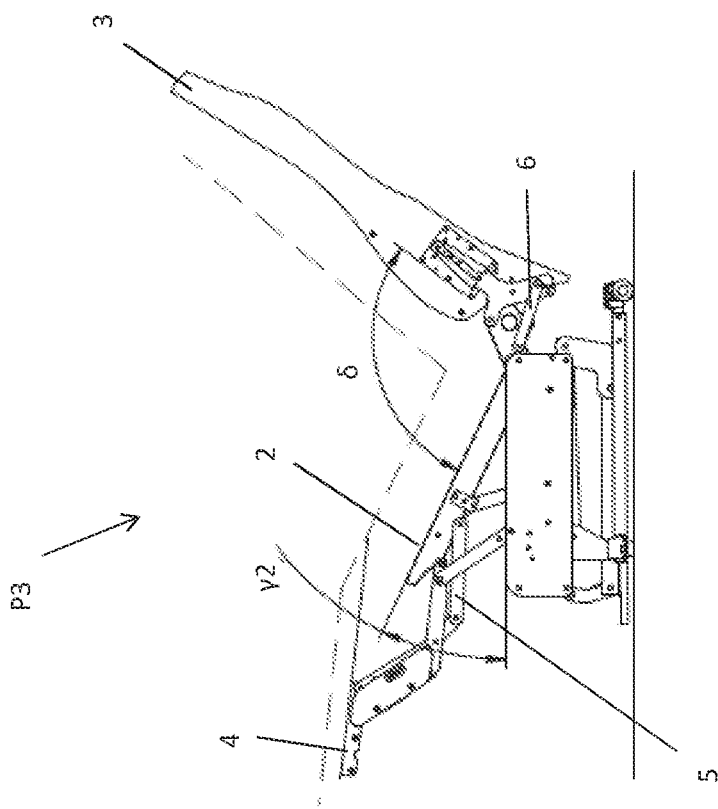

| | | | | |
|---|---|---|---|---|
| 2006/0208549 A1* | 9/2006 | Hancock | B60N 2/0252 | |
| | | | 297/342 | |
| 2011/0049963 A1* | 3/2011 | Shih | A47C 1/036 | |
| | | | 297/85 M | |
| 2011/0282495 A1* | 11/2011 | Fischer | H04L 67/104 | |
| | | | 709/204 | |
| 2013/0062914 A1* | 3/2013 | Marshall | A47C 7/506 | |
| | | | 297/69 | |
| 2014/0333099 A1* | 11/2014 | Lu | A47C 1/0355 | |
| | | | 297/83 | |
| 2015/0021959 A1* | 1/2015 | Garland | A47C 1/024 | |
| | | | 297/354.12 | |
| 2015/0076891 A1* | 3/2015 | LaPointe | A47C 31/008 | |
| | | | 297/85 M | |
| 2015/0145301 A1* | 5/2015 | Jacques | A47C 1/0242 | |
| | | | 297/260.1 | |
| 2015/0375865 A1* | 12/2015 | Fischer | B60N 2/22 | |
| | | | 701/49 | |
| 2016/0100687 A1* | 4/2016 | Murphy | A47C 1/0347 | |
| | | | 297/271.3 | |
| 2017/0099949 A1* | 4/2017 | Fortier | A47C 3/0251 | |
| 2017/0293281 A1* | 10/2017 | Li | A47C 1/0242 | |
| 2018/0228290 A1* | 8/2018 | Kiwak | A47C 1/03211 | |
| 2018/0271287 A1* | 9/2018 | Jacobs | A47C 1/124 | |
| 2020/0241497 A1* | 7/2020 | Li | A47C 7/506 | |
| 2020/0281806 A1* | 9/2020 | Le | A61H 1/00 | |
| 2021/0289939 A1* | 9/2021 | Loccioni | G05B 15/02 | |
| 2021/0386202 A1* | 12/2021 | Crum | A47C 1/0355 | |
| 2022/0117837 A1* | 4/2022 | Northen | A61H 7/001 | |

FOREIGN PATENT DOCUMENTS

| | | |
|---|---|---|
| DE | 19915003 | 10/2000 |
| DE | 19743902 | 6/2002 |
| DE | 19611345 | 11/2002 |
| DE | 202019100213 | 1/2019 |
| EP | 1738736 | 9/2007 |
| EP | 2305202 | 4/2015 |
| EP | 3143902 | 3/2017 |
| FR | 2712783 | 2/1996 |

* cited by examiner

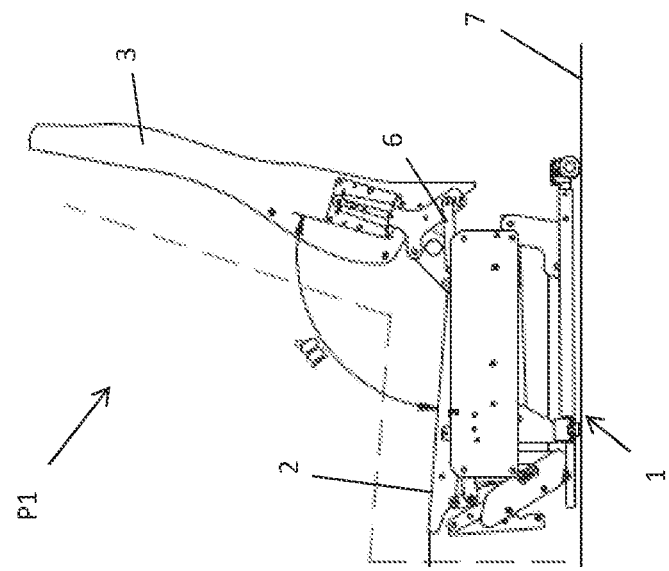
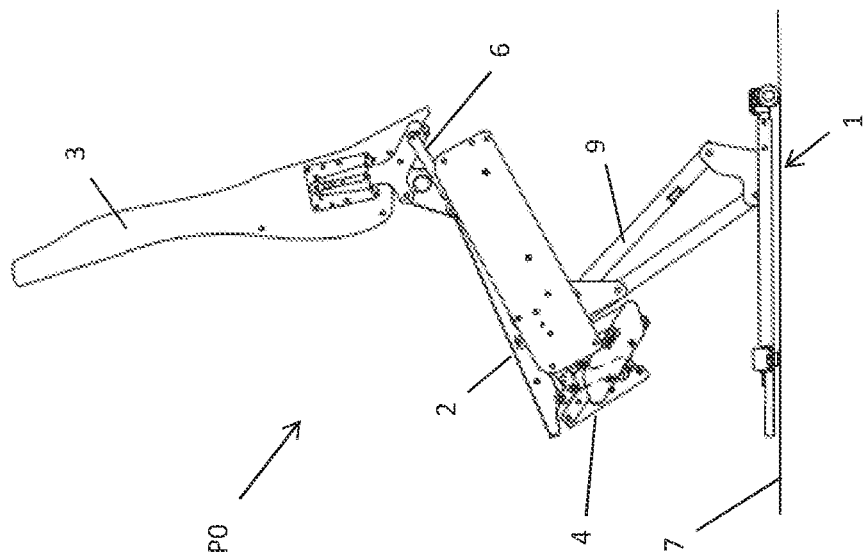
Fig. 1a
Fig. 1b

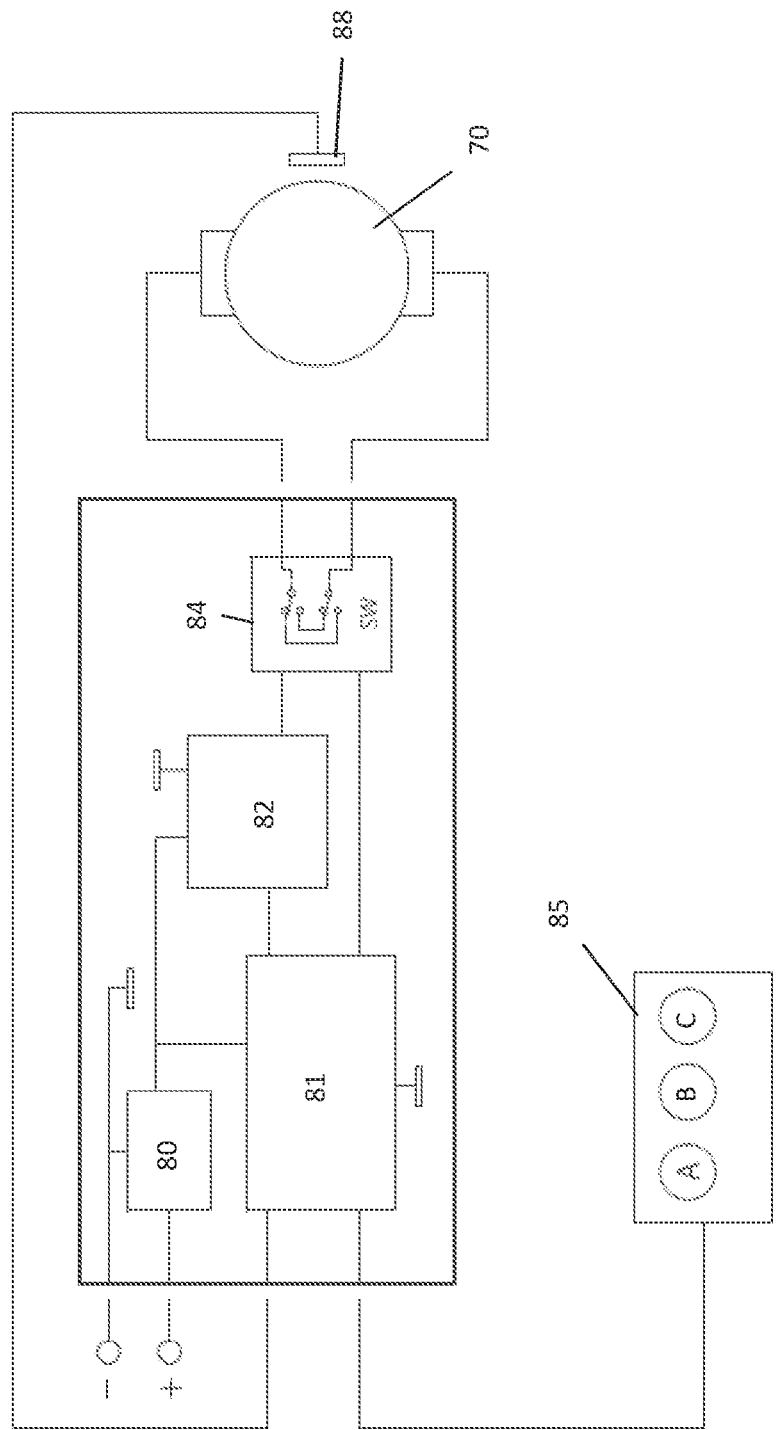

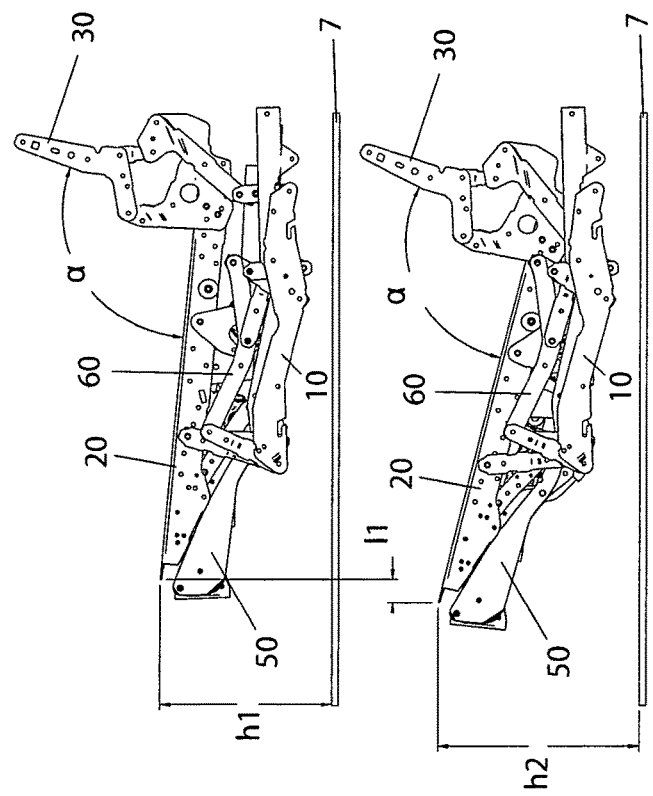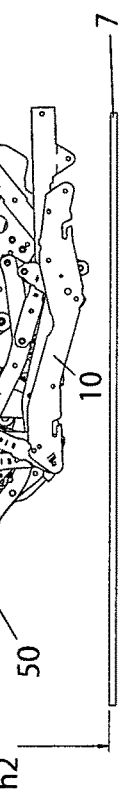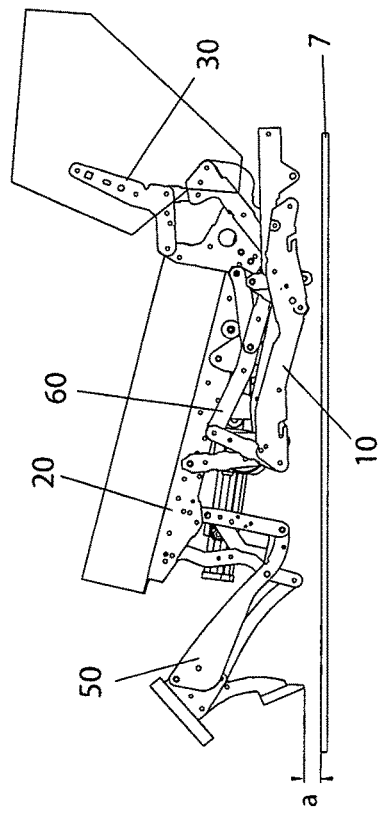

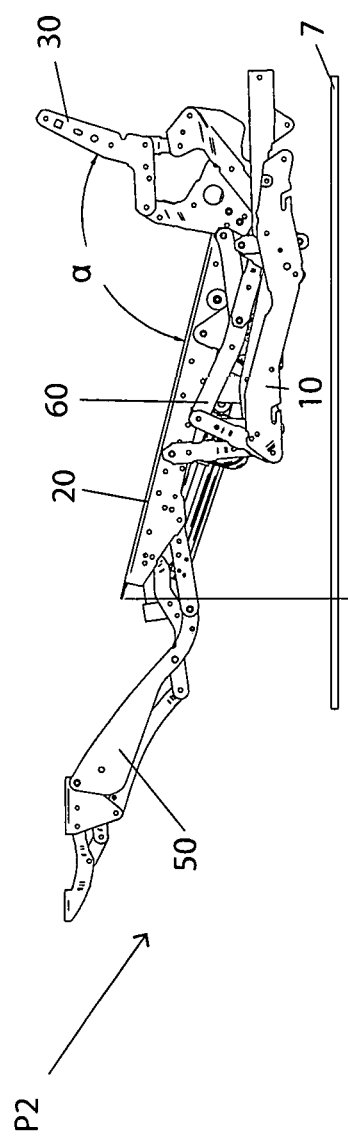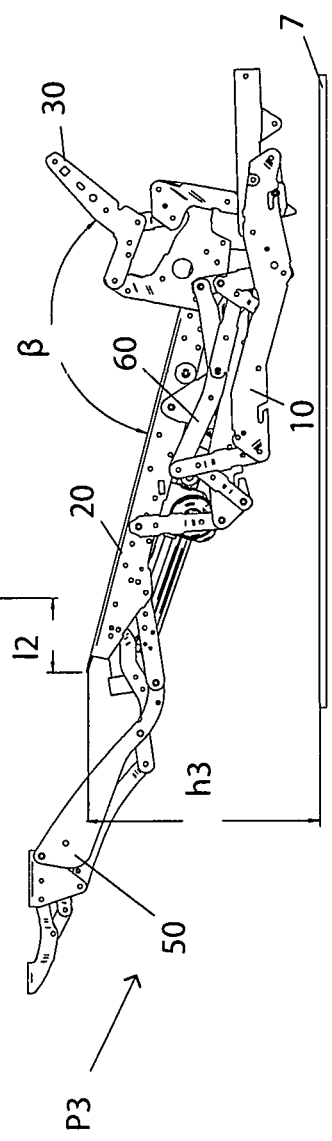

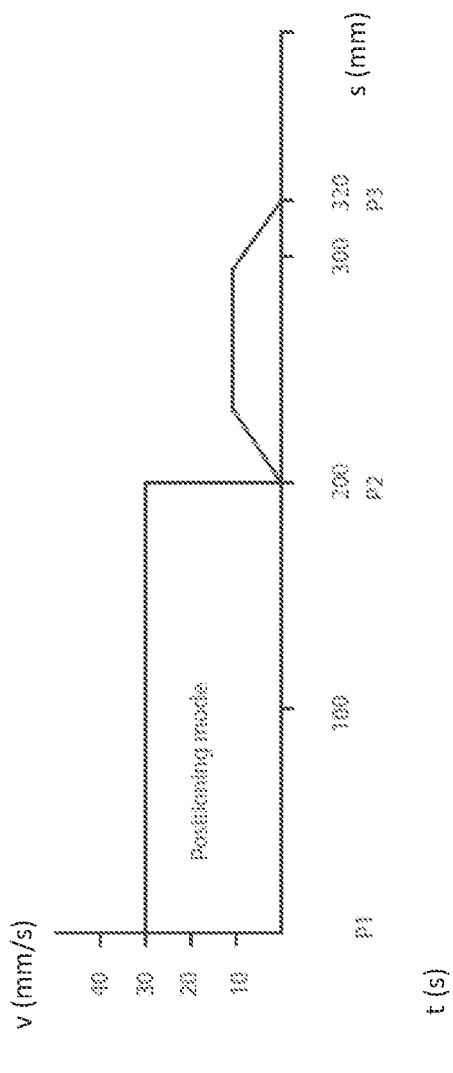
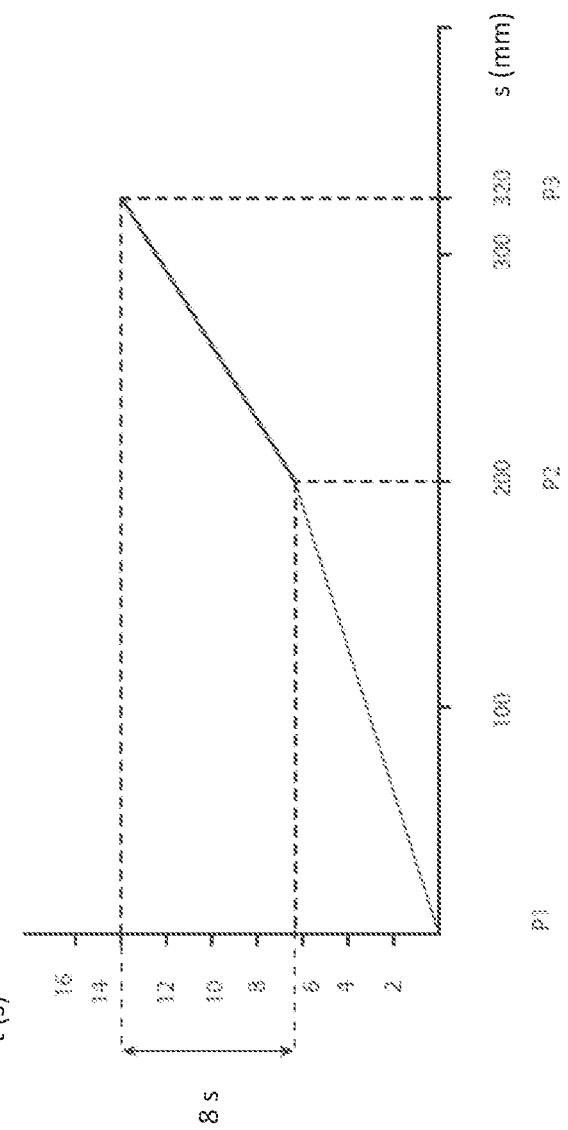

PIECE OF SEATING AND RECLINING FURNITURE AND METHOD FOR ADJUSTING A PIECE OF SEATING AND RECLINING FURNITURE

The invention relates to a piece of seating and reclining furniture comprising a seat, a backrest and an adjustment mechanism for changing the position of the seat and/or the backrest between at least a first and a second position.

These can be, in particular, reclining or relaxing chairs equipped with or without an aid for standing up, which can usually be brought from an upright basic position into at least one reclining position. Retractable and extendable footrests, which increase the comfort in the reclining position, are usually also provided. Such chairs are extremely comfortable and promote relaxation.

Almost everyone has to deal with back pain in the course of their life, which is caused in particular by lack of exercise, over-exertion and incorrect nutrition, but above all by long and incorrect sitting. Relaxing or recliner chairs are therefore perceived as very pleasant and relaxing.

From DE 20 2019 100 213 U1, a relaxation chair with an aid for standing up is known, which comprises a footrest, a seat and a backrest, which can be brought from a basic position into a raised position to facilitate standing up or at least into a relaxation position with the footrest extended.

Furthermore, EP 3 143 902 B1 discloses a recliner chair comprising a seat, a backrest and a footrest, which has a footrest adjustment mechanism with a first actuator for extending and retracting the footrest and a seat and backrest adjustment mechanism with a second actuator for adjusting the seat and the backrest.

Although a relaxed reclining position is perceived by the user as very pleasant, passive reclining is no substitute for movement of the body, such as occurs, for example, when walking or taking part in sport. However, in some circumstances natural movement of the body is not always possible to a sufficient extent for the most varied reasons (lack of time, physical ailments). So-called massage chairs have therefore been developed which are equipped with massage elements, for example massage rollers in the backrest. Actuation of the massage function has a relaxing effect on the back muscles and can relieve cramps and tension. Such a massage chair is known, for example, from EP 1 738 736 B1. However, such massage chairs are relatively complex and expensive due to the technology built into the backrest.

EP 2 305 202 B1 discloses a chair type massage machine comprising a seat portion, a backrest portion which is capable of being reclined about a back portion side of the seat portion as a reclining center and massage tools for performing a massage portion. Furthermore, it comprises a rocking mechanism portion for swinging the backrest portion in a reclined state in the front-back direction along with the seat portion while taking a position, which is different from the reclining center in the vertical direction, as a rocking center.

The object of the invention is to specify a more cost-effective piece of seating and reclining furniture with which effective relaxation is made possible for the user.

According to the invention, this object is achieved by the features of claims 1 and 10.

In the method according to the invention for adjusting a piece of seating and reclining furniture with a seat and a backrest, in a positioning mode the seat and/or the backrest are optionally positioned in an upright basic position, a first reclining position or a second reclining position by means of at least one actuator and the seat and/or the backrest in an activatable relaxation mode being movable back and forth. The seat and/or the backrest is adjusted in the positioning mode as well as in the activatable relaxation mode between the first reclining position and the second reclining position by means of the same actuator.

The piece of seating and reclining furniture according to the invention has a seat, a backrest and an adjustment mechanism for changing the position of the seat and/or the backrest between at least an upright basic position, a first reclining position and a second reclining position, the adjustment mechanism having at least one actuator and a controller for controlling the actuator, which controller provides at least one positioning mode for positioning the seat and/or the backrest in the upright basic position, the first reclining position or the second reclining position. Furthermore, the controller has a relaxation mode for moving the seat and/or the backrest back and forth between the first and the second reclining position. In the positioning mode as well as in the relaxation mode the seat and/or backrest is adjustable by the same actuator between the first and the second reclining position.

Sitting and reclining chairs, such as are known from DE 20 2019 100 213 U1 and EP 3 143 902 B1, usually only have one positioning mode in order to adjust the piece of sitting and reclining furniture, for example, from an upright basic position into a first reclining position or a second reclining position. The invention now makes use of this already existing technology by adding an activatable relaxation mode which enables a back-and-forth movement of the seat and/or the backrest between the first and the second reclining position. In this way, the user experiences a constant movement, which has a very beneficial and in particular relaxing effect on the user. The existing actuator(s) can be used for implementation, so that only a change of the controller is required.

It is particularly advantageous if the angle between the seat and the backrest also changes during the movement back and forth between the first and the second reclining position. The adjustment of the seat and/or the backrest is preferably adjusted by activation of at least one actuator, which is formed, for example, by a linear actuator with an electric motor, spindle and nut. However, two and more actuators can also be provided. The control of the actuator or actuators takes place by means of a pulse width modulation unit, which enables direct control of the actuator (electric motor) with a very high degree of efficiency. In particular, this enables a very simple adaptation of the speed of the actuator without significant energy losses.

Furthermore, it is advantageous if the speed of adjustment of the piece of seating and reclining furniture is greater in the positioning mode than in the relaxation mode. This enables a very smooth and gentle movement, above all in the relaxation mode, whilst the desired position can be reached more quickly in the positioning mode. It has also proved advantageous if the speed of adjustment of the piece of seating and reclining furniture is varied in the relaxation mode by the adjustment of the seat and/or the backrest being varied by braking and/or accelerating and/or pausing. Furthermore, it is conceivable that the speed of the actuator, by which the piece of seating and reclining furniture is adjusted in the relaxation mode, is reduced before the first or second reclining position is reached and increased again after reversal of the direction of rotation of the actuator. This in turn results in a very smooth sequence of movements, so that movement in the relaxation mode is also conceivable for a person sleeping on the piece of seating and reclining furniture.

According to a preferred embodiment of the invention, the seating and reclining furniture also has a footrest which is adjustable between a retracted position and an extended position. In this case, in particular, in a basic position of the piece of seating and reclining furniture, the footrest can be in the retracted position, and between the first and second reclining position the footrest can be in the extended position.

Furthermore, the adjustment mechanism can have a first actuator for adjusting the footrest and a second actuator for adjusting the seat and/or the backrest. However, it is also possible within the scope of the invention that both the seat and the backrest and also the footrest are actuated by one single actuator.

The tests on which the invention is based have shown that the best relaxation results are achieved when the relaxation mode can only be activated between the first and the second reclining position when the footrest is also extended. In order that the relaxation mode can only be activated between the first reclining position and the second reclining position, suitable sensors (e.g. rotary encoder, distance sensor) can be provided, which only enable the relaxation mode when the first reclining position is reached. Thus, the relaxation mode would not be possible if the piece of seating and reclining furniture is in the upright basic position or in a position before the first reclining position is reached.

Further configurations of the invention are explained in more detail with reference to the following description of two exemplary embodiments.

Figure 3:
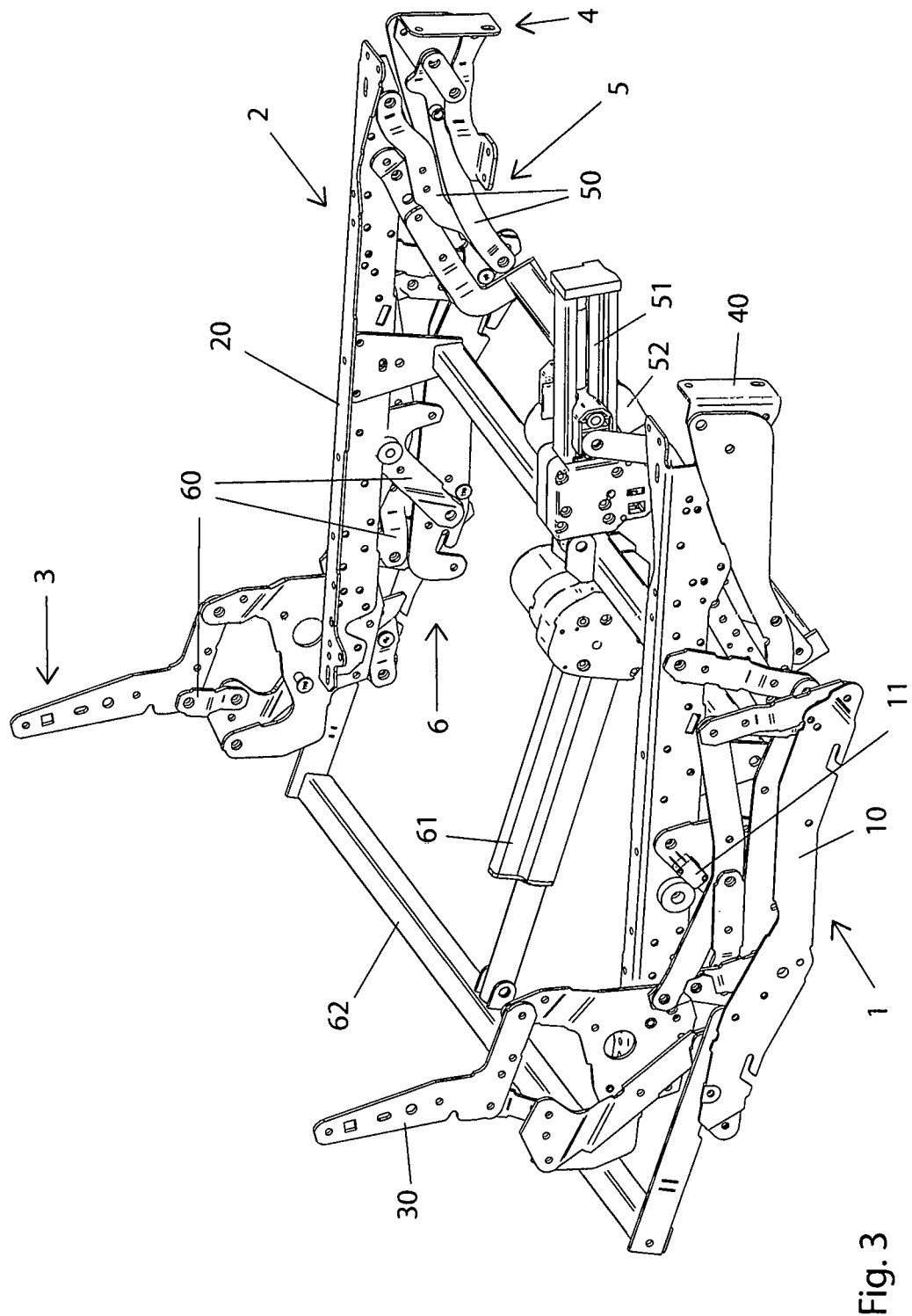
Figure 5:
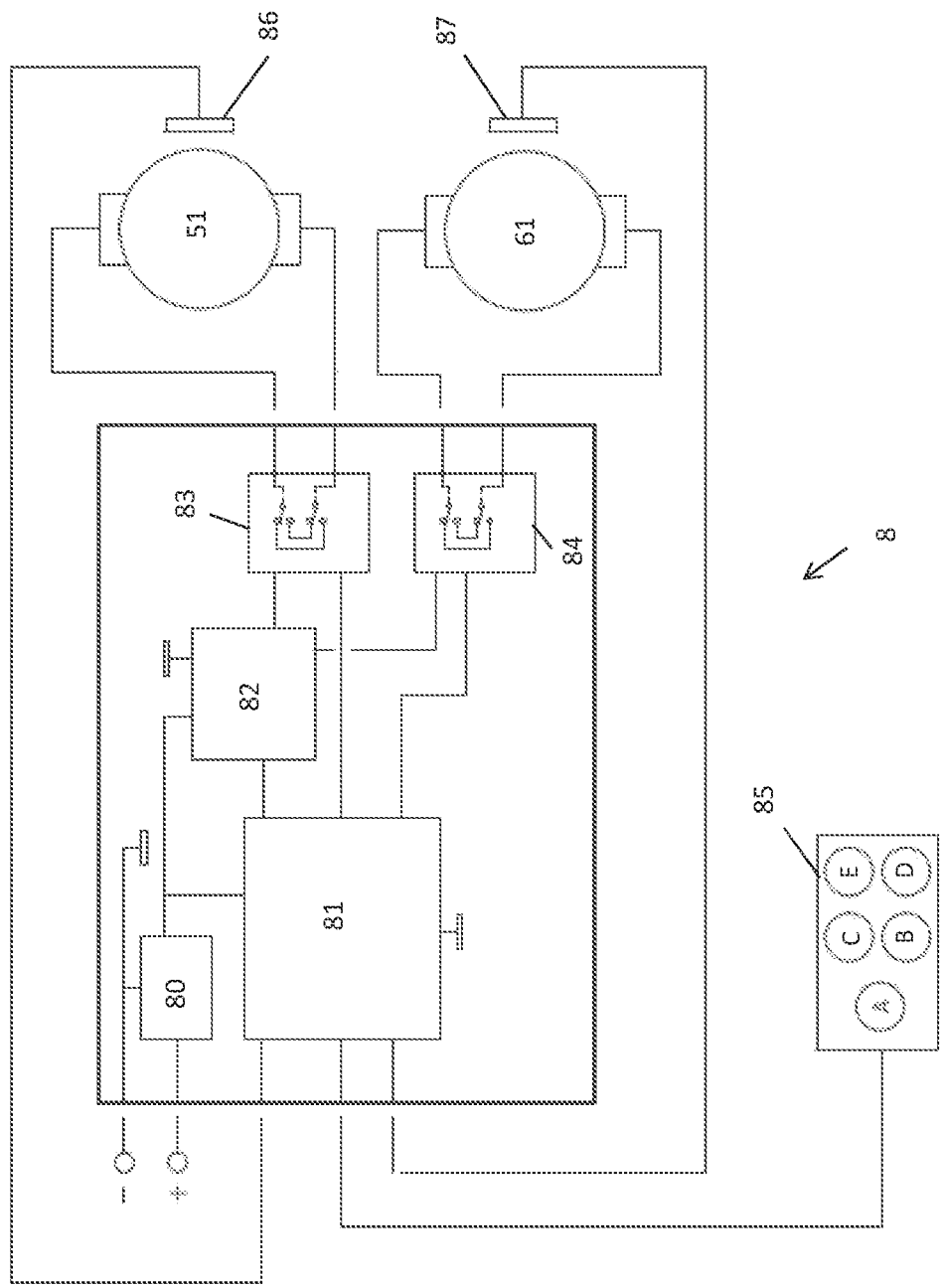
Figure 6:
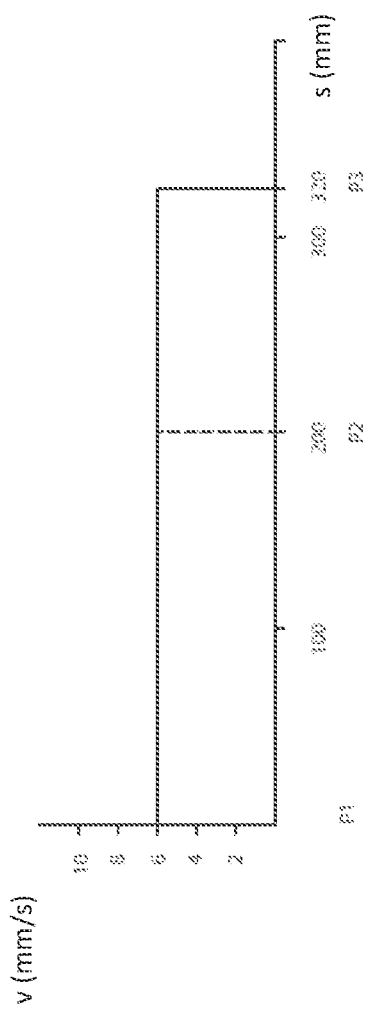
Figure 7:
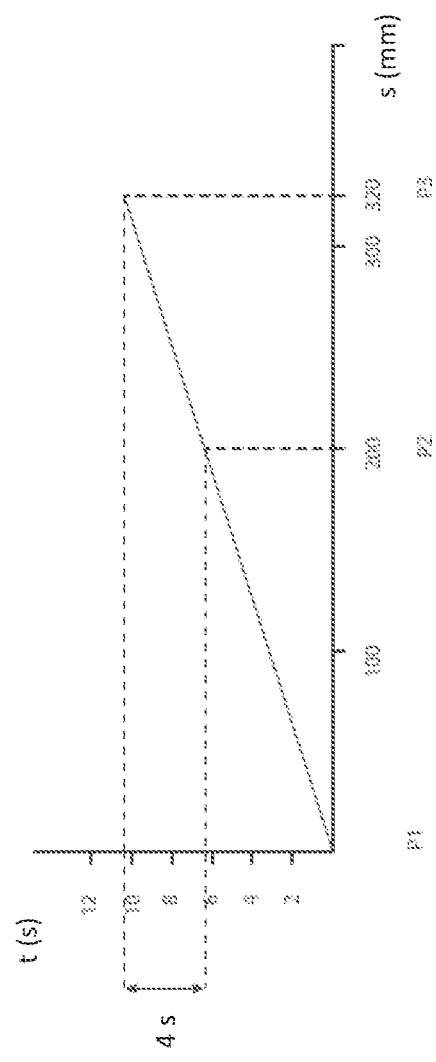
Figure 10:
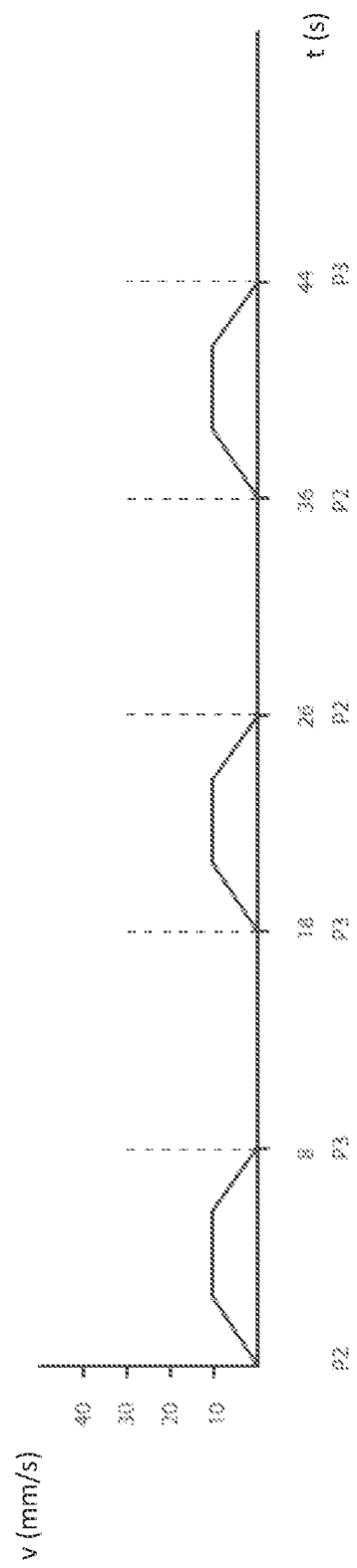

In the drawings:

FIGS. 1a-1d show schematic side views of a first embodiment of a piece of seating and reclining furniture in different positions, FIG. 2 shows a block diagram of the controller for the first embodiment, FIG. 3 shows a three-dimensional representation of a second embodiment of the piece of seating and reclining furniture, FIGS. 4a-4e show side views of the second embodiment of the piece of seating and reclining furniture in different positions, FIG. 5 shows a block diagram of the controller for the second embodiment, FIG. 6 shows a speed/distance diagram in the positioning mode according to a first variant, FIG. 7 shows an associated time/distance diagram, FIG. 8 shows a speed/distance diagram in the positioning and relaxation mode, FIG. 9 shows an associated time/distance diagram and FIG. 10 shows a multi-cycle speed/time diagram in the relaxation mode.

FIGS. 1a to 1d show a piece of seating and reclining furniture according to a first exemplary embodiment, which comprises a frame 1, a seat 2, a backrest 3 and a retractable and extendable footrest 4. Furthermore, a footrest adjustment mechanism 5 for extending and retracting the footrest 4 and a seat and backrest adjustment mechanism 6 for changing the position of the seat and/or the backrest are provided. The footrest adjustment mechanism 5 and the seat and backrest adjustment mechanism 6 interact with an actuator 70 (FIG. 2) which, however, is not shown in more detail in FIGS. 1a to 1d. For further details regarding the mechanism, reference is hereby made to DE 20 2019 100 213 U1.

Figure 1C:
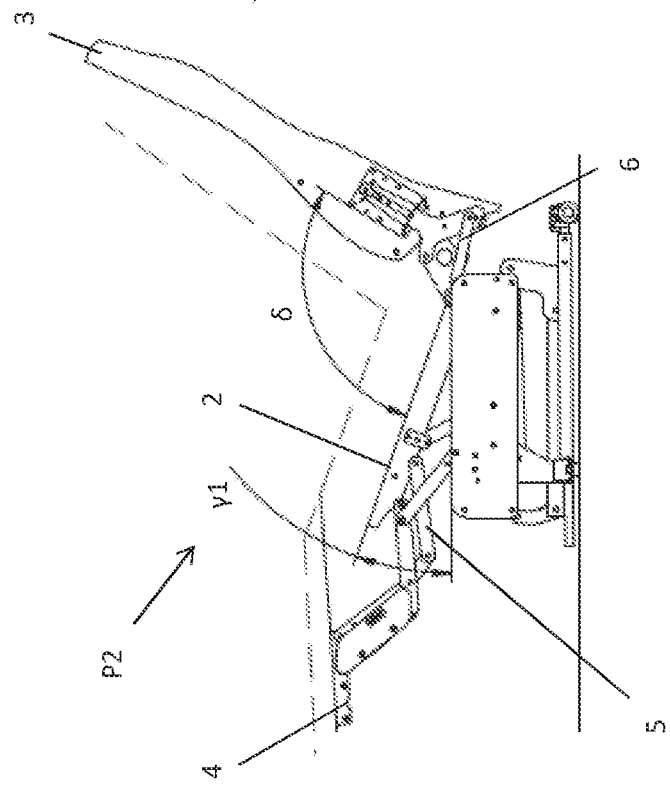

Starting from an upright basic position P1 of the piece of seating and reclining furniture according to FIG. 1b, a first reclining position P2 according to FIG. 1c can be reached by actuation of the actuator 70 with the aid of the footrest adjustment mechanism 5 and the seat and backrest adjustment mechanism 6. If the actuator 70 is driven further beyond the first reclining position P2, the piece of seating and reclining furniture assumes the second reclining position P3 according to FIG. 1d, in which the seat 2 together with the footrest 4 and the backrest 3 are inclined further backwards. Thus, in the first reclining position P2, the seat 2 assumes an angle γ1 of, for example, 20° with respect to the horizontal. In the second reclining position P3, the angle γ2 is, for example, 25°. The angle δ between the seat 2 and the backrest 3 remains unchanged in the positions P2 and P3 in this embodiment. An appropriately designed mechanism could also increase the angle δ when moving from the first position P2 to the second position P3.

However, in addition to the first reclining position P2 and the second reclining position P3, an aid for standing up 9 can also be activated by driving the actuator 70 in the opposite direction starting from the basic position P1. The seat is then raised by means of a corresponding mechanism and tilted slightly forward, so that the user can get up quite easily from the upholstery (position P0 according to FIG. 1a). This functionality is particularly gentle on the back, as no sudden effort is required when standing up. However, this mechanism also makes it possible to sit down particularly gently and easily.

The special feature of this first exemplary embodiment is that all the positions of the piece of seating and reclining furniture shown in FIGS. 1a to 1d can be controlled with the aid of one single actuator 70. DE 20 2019 100 213 U1 describes a specific example of how this can be implemented. For more details on the implementation of the mechanism with one single actuator, reference is therefore explicitly made to this utility model.

The controller of the actuator 70 is described in more detail below with reference to FIG. 2. It comprises a power supply unit 80 which can be connected to the power supply network, a microprocessor 81, a pulse width modulation unit 82 and a switch 83 for controlling the actuator 70. Furthermore, a manual controller 85 is also provided, with which a positioning mode (buttons "B" and "C") and a relaxation mode (button "A") can be activated. The power supply unit 80 supplies the microprocessor 81 and the pulse width modulation unit 82 with the required voltage. The control commands activated on the manual controller 85 via the buttons A, B or C are implemented by the microprocessor 81, which subsequently controls the pulse width modulation unit 82 and the switch 83.

For example, in the positioning mode it could be provided that the actuator 70 is controlled via the microprocessor by pressing the button B such that the piece of seating and reclining furniture moves from the basic position P1 according to FIG. 1b to the first reclining position P2 according to FIG. 1c. Pressing the button B again causes a further adjustment to the second reclining position P3. If, on the other hand, the button C is pressed, the direction of rotation of the actuator 70 is reversed, so that a retrograde adjustment from P3 to P2 or from P2 to P1 takes place there.

If the piece of seating and reclining furniture is in the basic position P1 according to FIG. 1b and the button C is then pressed, the actuator is also actuated in the opposite direction of rotation, whereby the aid for standing up 9 is activated, causing an adjustment to the raised position P0 according to FIG. 1a. In order to move from the raised position P0 into one of the other positions P1, P2 or P3, the button B must be pressed once, twice or three times.

The operation of the manual controller 85 as described above activates the positioning mode, which leads to the piece of seating and reclining furniture assuming one of the positions according to FIG. 1*a*, 1*b*, 1*c* or 1*d*.

To activate the relaxation mode, the button A on the manual controller 85 is pressed and causes the piece of seating furniture to move back and forth between the two reclining positions P2 and P3. A more detailed description of the relaxation mode is given below with reference to FIGS. 8 to 10. A safety query in the microprocessor 81 when the button A is activated can provide that the relaxation mode can only be activated when the piece of seating and reclining furniture is located in the first or the second reclining position P2, P3, that is to say either in the position according to FIG. 1*c* or the positions shown in FIG. 1*d*. If this is not the case, it could be provided in the microprocessor 81 that the activation of the relaxation mode is blocked. Alternatively, however, it is also conceivable that activation of the relaxation mode in the upright basic position P1 according to FIG. 1*b* or the raised position P0 first causes the piece of seating and reclining furniture to be positioned in the first reclining position P2 in order then to switch to the relaxation mode.

So that the microprocessor 81 knows the position of the piece of seating and reclining furniture, a sensor 88, which detects the respective position of the actuator 70 and thus also the position of the piece of seating and reclining furniture, can be assigned to the first actuator 70. The sensor 88 is connected to the microprocessor 81 and can be designed, for example, as a rotary encoder or distance sensor.

FIGS. 3 to 5 show a second exemplary embodiment of a piece of seating and reclining furniture, only the parts relevant for the adjustment of the piece of seating and reclining furniture being shown. Any upholstery of the backrest and seat, and also the other body of the piece of seating and reclining furniture are not shown here. The piece of seating and reclining furniture in turn has a frame 1 for setting down on a floor 7, only a fixed frame part 10 of said frame being shown here. Furthermore, it is provided with a seat 2 which is illustrated by a seat support 20, a backrest 3 which is illustrated by a backrest support 30, and a footrest 4 which is indicated by its footrest support 40.

A footrest adjustment mechanism 5 which has a first mechanical linkage 50 and a first actuator 51 is also provided for extending and retracting the footrest 4. The first mechanical linkage 50 is articulated in the region of the seat support 20. In a corresponding manner a seat/backrest adjustment mechanism 6 with a second mechanical linkage 60 and a second actuator 61 is provided for the adjustment of the seat 2 and the backrest 3 from an upright basic position P1 (FIG. 4*a*) to a first reclining position P2 (FIG. 4*d*) or a second reclining position P3 (FIG. 4*c*). The second mechanical linkage 60 connects the seat support 20 and the backrest 3 and is articulated to the fixed frame part 10. In the exemplary embodiment shown, the seat support 20 consists of two laterally opposing parts which are connected to one another approximately centrally via a first cross member 21. The first mechanical linkage 50 of the footrest adjustment mechanism 5 is also formed symmetrically to the longitudinal center plane of the piece of seating and reclining furniture, the two sides being connected to one another via a second cross member 52. In a corresponding manner, the second mechanical linkage 60 of the seat/backrest adjustment mechanism 6 is formed in mirror symmetry on both sides, and the two sides are coupled to one another via a third cross member 62. The first actuator 51 is arranged between the first cross member 21 and the second cross member 52, so that actuation of the first actuator 51 leads to the first mechanical linkage 50 of the footrest adjustment mechanism 5 articulated on the seat support 20 being adjusted relative to the seat support 2 in the sense of an extension or retraction of the footrest 4. The second mechanical linkage 60 for adjusting the seat 2 and backrest 3 is articulated to the fixed frame part 10, actuation of the second actuator 61 causing an adjustment of the seat 2 and the backrest 3.

FIGS. 4*a* to 4*f* show the different positions that the piece of seating and reclining furniture can assume. FIG. 4*a* shows the upright basic position P1 with the footrest retracted. The angle α between the seat 2 and the backrest 3 is, for example, 105°+/−10°. The seat support 20 has in its front region a distance h1 from the floor 7 which is, for example, 260 mm+/−30 mm.

FIG. 4*b* shows a first intermediate position which is reached by actuating the second actuator 61 of the seat/backrest adjustment mechanism 6. Here, the second mechanical linkage 60 initially causes only a shift of the seat 2 or the seat support 20 forward and a simultaneous lifting of the front region. The backrest 3 or the backrest support 30 are taken along, the angle α between the seat 2 and the backrest 3 remaining the same in relation to the upright basic position P1. The front region of the seat 2 is pushed forward by L1, for example, 40 mm+/−10 mm. The height of the front region of the seat support 20 relative to the floor 7 increases to h2, for example 300 mm+/−30 mm. On the one hand, this movement causes the backrest 3 to be tilted backwards relative to the floor, without, however, significantly reducing the distance from any rear wall which may be present. In order to achieve this, the seat 2 is moved forward. This type of synchronous movement of the seat 2 and the backrest 3 is widely known from the prior art and therefore is not explained in detail.

The footrest adjustment mechanism 5 requires a clear distance of the front end of the seat 2 from the floor which is greater than the clear distance present in the upright basic position P1 according to FIG. 4*a* and is smaller than the clear distance present in the first intermediate position according to FIG. 4*b*. In other words, the footrest 4 cannot be extended in the upright basic position P1 according to FIG. 4*a*, because it would otherwise come into contact with the floor and block it.

FIG. 4*c* shows the footrest half-extended by corresponding actuation of the first actuator 51. It can be seen that in this position there is a distance a between the footrest and the floor 7 which is expediently chosen to be only large enough to enable the footrest to be extended or retracted without contacting the floor.

With conventional recliner chairs with extendable footrests, the footrest can also be swiveled in or out at any time in the upright basic position.

Due to the special design of the recliner shown here, the footrest can only be actuated in the intermediate position according to FIG. 4*b*, but this has the advantage that the footrest can be made longer by the amount by which the front region of the seat is raised. Thus, in the exemplary embodiment shown, the footrest can be extended by the dimension h2−h1. This increases comfort when the user puts his feet down. Alternatively, however, it would also be conceivable not to increase the length of the footrest and instead to lower the seat support accordingly and to convert the height gained thereby into a corresponding reinforcement of the seat upholstery.

The fully extended footrest 4 is shown in the first reclining position P2 in FIG. 4*d*, in which position the angle α between the seat and the backrest is still unchanged. Only by further actuation of the second actuator 61 of the seat backrest/adjustment mechanism 6 in the second reclining position P3 according to FIG. 4e does the angle between the seat 2 and the backrest 3 increase to an angle β, with β−α for example 30°+/−15°. With this enlargement of the angle, the seat 2 or seat support 20 is again pushed forward by the dimension L2, so that when the front end of the seat 2 moves from the upright basic position P1 according to FIG. 4a into the second reclining position according to FIG. 4e it is displaced in the direction of its front end by 140 mm+/−30 mm.

Although in the illustrated exemplary embodiment the angle between the seat and the backrest is not changed between the upright basic position P1 and the first reclining position P2, the seat/backrest adjustment mechanism 6 can of course also be designed such that this angle changes already in this first adjustment phase.

In order to prevent the first actuator 51 for the footrest 4 from being actuated in the upright basic position P1 according to FIG. 4a, a sensor or switch 11 is provided (FIG. 1) which detects whether the recliner chair has already reached the intermediate position shown in FIG. 4b, and thus the distance necessary for extending the footrest 4 is available. The controller 8 shown in FIG. 5 ensures that the first actuator 51 is only released or can only be activated when the sensor or switch 11 has recognized that the first intermediate position according to FIG. 4b has been reached.

When this piece of seating and reclining furniture is being adjusted, a distinction is made between a positioning mode and a relaxation mode. The controller 8 required for this is shown in more detail in FIG. 5 and corresponds substantially to the controller of the first exemplary embodiment according to FIG. 2. It differs primarily in that two actuators, namely the first actuator 51 and the second actuator 61, are controlled, and the manual controller therefore has additional functions/buttons.

The control commands activated on the manual control 85 are implemented by the microprocessor 81, which subsequently controls the pulse width modulation unit 82 and the switches 83 and 84, depending on which of the two actuators 51, 61 is to be activated. For example, it could be provided that the first actuator 51 can be controlled by the button B, so that it moves the piece of seating and reclining furniture from the basic position P1 of FIG. 4a into the position according to FIG. 4b or from the position according to FIG. 4b into the first reclining position P2 according to FIG. 4d, depending on the position in which the piece of seating and reclining furniture is currently located. With the button D, the actuator 51 is activated by reversing the direction of rotation in the opposite direction, so that an adjustment from FIG. 4d to FIG. 4b or from FIG. 4b to FIG. 4a takes place.

The buttons D and E are used to control the second actuator 61 with the reversed direction of rotation. Pressing the button D could, for example, cause an adjustment to the second reclining position P3 according to FIG. 4e, regardless of the position in which the piece of seating and reclining furniture is currently located. This would possibly require subsequent control of the first and second actuators 51, 61 if the piece of seating and reclining furniture were still in the basic position P1. An actuation of the button E is connected to an adjustment to the first reclining position P2 according to FIG. 4d.

The positioning mode is activated by the buttons B, C, D and E of the manual controller 85, which leads to the piece of seating and reclining furniture assuming one of the positions according to FIG. 4a, 4b, 4d or 4e. The position according to FIG. 4c is only an intermediate position, which cannot be approached explicitly.

To activate the relaxation mode, the button A on the manual controller 85 is pressed. A safety query in the microprocessor 81 can, however, provide that the relaxation mode can only be activated when the piece of seating and reclining furniture is in the first or second reclining position, i.e., either in the first reclining position P2 according to FIG. 4d or in the second reclining position P3 according to FIG. 4e. If this is not the case, it could be provided in the microprocessor that the activation of the relaxation mode is not carried out. Alternatively, however, it is also conceivable that activation of the relaxation mode in the upright basic position P1 according to FIG. 4a first causes the piece of seating and reclining furniture to be positioned in the first reclining position P2 according to FIG. 4d in order to then subsequently switch to the relaxation mode.

So that the microprocessor 81 knows the position of the piece of seating and reclining furniture, either the sensor or switch 11 is provided and/or a first sensor 86 is assigned to the first actuator 51 and a second sensor 87 is assigned to the second actuator 61, the two sensors 86, 87 being designed such that they recognize the respective position of the actuators and thus also the position of the piece of seating and reclining furniture. The sensors can be designed, for example, as rotary encoders or distance sensors. The sensors 11, 86, 87 are therefore connected to the microprocessor 81.

If the user activates the relaxation mode with the button A, the seat 2 and the backrest 3 are moved back and forth between the first reclining position P2 and the second reclining position P3. In the present exemplary embodiment, this means that the second actuator 61 is activated in such a way that the piece of seating and reclining furniture moves from the first reclining position P2 to the second reclining position P3, the direction of rotation of the actuator 61 is reversed there and then the piece of seating and reclining furniture moves back into the first reclining position P2. Depending on the selected program, this process is then repeated several times until the program has finished or is interrupted by the user.

Although a footrest 4 was present in each of the two exemplary embodiments described above, it is also quite conceivable within the scope of the invention that the piece of seating and reclining furniture has no footrest or that the relaxation mode can also be carried out without the footrest extended.

Various examples of how the actuators are controlled in the positioning mode or relaxation mode are explained with reference to FIGS. 6 to 11. In the diagrams, P1 denotes the upright basic position according to FIG. 1b or FIG. 4a. The first reclining position according to FIGS. 1c and 4d is designated by P2 and the second reclining position according to FIGS. 1d and 4e is designated by P3.

FIG. 6 shows a speed/distance diagram for the positioning mode from the position P1 via the position P2 to the position P3. The specified travel distance relates to the stroke of the associated actuator, which is defined by the travel distance of the nut on the spindle in the case of a linear actuator with a spindle and a nut. It can be seen from FIG. 6 that a stroke of 200 mm is required from the position P1 to the position P2 and a further stroke of 120 mm is required from the position P2 to the position P3, the stroke being performed at a constant speed of 6 mm/s. In the case of the first exemplary embodiment, the entire stroke of 320 mm is carried out by the actuator 70, while in the second exemplary embodiment the adjustment from P1 to P2 is effected by the first actuator 51 and the adjustment from P2 to P3 is effected by the second actuator 61.

The associated time/distance diagram is shown in FIG. 7, from which it can be seen that it takes about 6 seconds to move from P1 to P2 and another 4 seconds to move to the position P3. Of course, the details of all values are only to be understood as examples.

FIG. 8 shows a speed/distance diagram in which the positioning mode is carried out between the positions P1 and P2 and a relaxation mode is carried out between the positions P2 and P3. It can be seen that the positioning mode takes place relatively quickly at a speed of 30 mm/s, while the speed in the relaxation mode is significantly lower, in particular less than half. Moreover, it can be seen that the speed is varied in the relaxation mode. Thus, the associated actuator is first accelerated from the position P2 in order to then continue to run at a constant speed before decelerating shortly before reaching the second position P3, so that the speed at the position P3 is 0.

In the associated time/distance diagram according to FIG. 9, it can also be seen that about 6 seconds are required for the distance of 200 mm in the positioning mode, while a longer time of 8 seconds is set for the significantly shorter distance of 120 mm in the relaxation mode. This takes into account the user's wish that the desired position should be reached quickly in the positioning mode, while the movement in the relaxation mode should take place gently and slowly.

The relaxation mode is characterized by a movement back and forth between the positions P2 and P3. The number of repeating cycles is therefore either predetermined by the selected program or can be interrupted by the user. In the speed/time diagram according to FIG. 10 it can be seen that adjustment from the position P2 to P3 and vice versa is characterized by an acceleration section, a section that remains constant in speed, and a braking section. In addition, the actuator is only reversed in its direction of rotation after a certain pause in order only then to carry out the movement pattern comprising acceleration, constant speed and braking. It is, of course, conceivable within the scope of the invention that the pause times or the braking and acceleration phases are also changed within one program after one or more repeating cycles. In this case the time for the adjustment between P2 and P3 or vice versa can also be varied. It is particularly advantageous if the user can choose between different relaxation programs by pressing the button A once or twice in quick succession. Of course, the manual controller can also be equipped with additional buttons for different relaxation modes.

The invention claimed is:

1. A method for adjusting a piece of seating and reclining furniture with a seat and a backrest, the seat and/or the backrest (a) in a positioning mode, being selectively positioned in an upright basic position, a first reclining position, or a second reclining position by means of at least one actuator, and (b) in an activatable relaxation mode, being moved repeatedly back and forth between the first reclining position and the second reclining position, wherein the seat and/or the backrest is adjusted in the positioning mode as well as in the activatable relaxation mode between the first reclining position and the second reclining position by means of the same actuator, and the angle between the seat and the backrest changes during movement back and forth between the first and second reclining position.

2. The method according to claim 1, characterized in that the actuator is controlled by a pulse width modulation unit.

3. The method according to claim 1, characterized in that the relaxation mode can only be activated when the seat and/or the backrest are located in the first reclining position or in the second reclining position or between the first reclining position or the reclining second position.

4. The method according to claim 3, characterized in that at least one sensor detects whether the seat and/or the backrest is located in the first reclining position or second reclining position or between the first reclining position or second reclining position.

5. The method according to claim 1, characterized in that an adjustment speed of the piece of seating and reclining furniture is greater in the positioning mode than in the relaxation mode.

6. The method according to claim 1, characterized in that an adjustment speed of the piece of seating and reclining furniture is varied in the relaxation mode.

7. The method according to claim 1, characterized in that in the relaxation mode the adjustment of the seat and/or the backrest is varied by braking and/or accelerating and/or pausing.

8. The method according to claim 1, characterized in that in the relaxation mode the direction of rotation of the actuator is reversed when the first reclining position or the second reclining position is reached.

9. The method according to claim 8, characterized in that the speed of the actuator by which the piece of seating and reclining furniture is adjusted in the relaxation mode is reduced before the first reclining position or second reclining position is reached, and is increased again after reversal of the direction of rotation of the actuator.

10. The piece of seating and reclining furniture according to claim 1, characterized in that at least one sensor is provided for detecting the position of the piece of seating and reclining furniture.

11. The piece of seating and reclining furniture according to claim 1, characterized in that a footrest is further provided which is adjustable between a retracted position and an extended position, the footrest being in a retracted position in the upright basic position and between the first reclining position and second reclining position in the extended position.

12. A piece of seating and reclining furniture comprising a seat, a backrest and an adjustment mechanism for changing the position of the seat and/or the backrest between an upright basic position, a first reclining position, and a second reclining position,
the adjustment mechanism having at least one actuator and a controller for controlling the actuator, the controller having (a) a positioning mode for positioning the seat and/or backrest in the upright basic position, the first reclining position, and the second reclining position, and (b) a relaxation mode for moving the seat and/or the backrest repeatedly back and forth between the first reclining position and the second reclining position, wherein the angle between the seat and the backrest in the second reclining position is larger than in the first reclining position,
wherein, in the positioning mode as well as in the relaxation mode, the seat and/or backrest is adjustable by the same actuator between the first reclining position and the second reclining position.

13. The piece of seating and reclining furniture according to claim 12, characterized in that the controller has a pulse width modulation unit for speed control of the actuator.

14. The piece of seating and reclining furniture according to claim 12, characterized in that the relaxation mode comprises a plurality of cycles between the first reclining position and the second reclining position.

* * * * *